United States Patent [19]

Grant

[11] Patent Number: 4,488,567
[45] Date of Patent: Dec. 18, 1984

[54] AUTOMATIC VALVE CLOSER

[76] Inventor: Willie T. Grant, 400 S. Simms St., Lakewood, Colo. 80228

[21] Appl. No.: 510,756

[22] Filed: Jul. 5, 1983

[51] Int. Cl.³ .................. H01H 35/00; G08B 21/00
[52] U.S. Cl. ................................ 137/78.1; 137/312; 251/134; 307/118; 340/605; 361/178
[58] Field of Search ............... 251/133, 134; 361/178; 307/118; 137/78.1, 312; 340/604, 605

[56] References Cited

U.S. PATENT DOCUMENTS

| | | | |
|---|---|---|---|
| 1,943,854 | 1/1934 | Beckwith | 251/134 |
| 2,325,725 | 8/1943 | Wood | 251/133 |
| 3,387,748 | 6/1968 | Brenchley | 251/133 |
| 3,770,002 | 11/1973 | Brown | 137/312 |
| 3,796,925 | 3/1974 | Breeding | 361/178 |
| 3,874,403 | 4/1975 | Fischer | 340/605 |
| 4,305,420 | 12/1981 | Nussdorf | 307/118 |
| 4,324,268 | 4/1982 | Jacobson | 307/118 |

Primary Examiner—A. Michael Chambers

[57] ABSTRACT

Valve closure means having a low rpm motor with a shaft coupled to the stem of a shutoff valve located in the supply line of a water heater or like device; said motor having support means attaching to the supply line is energized to rotate said shutoff valve to a closed position when the tank of said water heater or like device ruptures, thereby terminating flow in the supply line.

3 Claims, 2 Drawing Figures

AUTOMATIC VALVE CLOSER

The primary element in a domestic water heater or like equipment is the tank which retains the liquid entering via the supply line. After providing years of service, the tank may rupture without warning causing the contents to rapidly empty onto the floor, while the flow in the supply line continues. In the case where the occupant of the residence is not home at the time rupture, considerable water can be discharged, and water damage can be extensive, depending upon the location and condition of the drain facilities.

The subject automatic valve closer overcomes this deficiency in present domestic water heaters and like equipment by providing automatic closing means for valves used with water heaters or like equipment. The aforesaid valve having closing means attached thereto remains in an open or substantially open position during the normal day-to-day operation of the equipment. However, at the time the tank develops a noticeable leak or ruptures, a quantity of the liquid will run into a special container placed beneath the tank, thereby closing electrical contacts and permitting said automatic closing means to rotate the valve in the supply line to a closed position, terminating all flow into the defective tank. The valve remains in the closed position until steps are taken to again open said valve.

Thus, in general, only that volume of liquid stored in the tank will exit, along with a minimum amount of water flowing through the supply line before said valve is rotated to a closed position.

It is therefore a principal object of the present invention to minimize the loss of liquid and resulting damage caused by a leaking or ruptured tank.

Another object is to provide a detection means and an automatic valve closing means that will rapidly close the supply line valve on equipment when a leak or rupture occurs.

Another object is to provide a detection means and an automatic valve closure means that will be economical and easily installed.

Another object is to provide a manual override switch for the automatic closure means.

Another object is to provide a closure means having very low maintenance requirements.

These and other objects and advantages of the present invention will become apparent after considering the following detailed specification which covers a preferred embodiment thereof in conjunction with the acompanying drawings, wherein.

Figure 1:
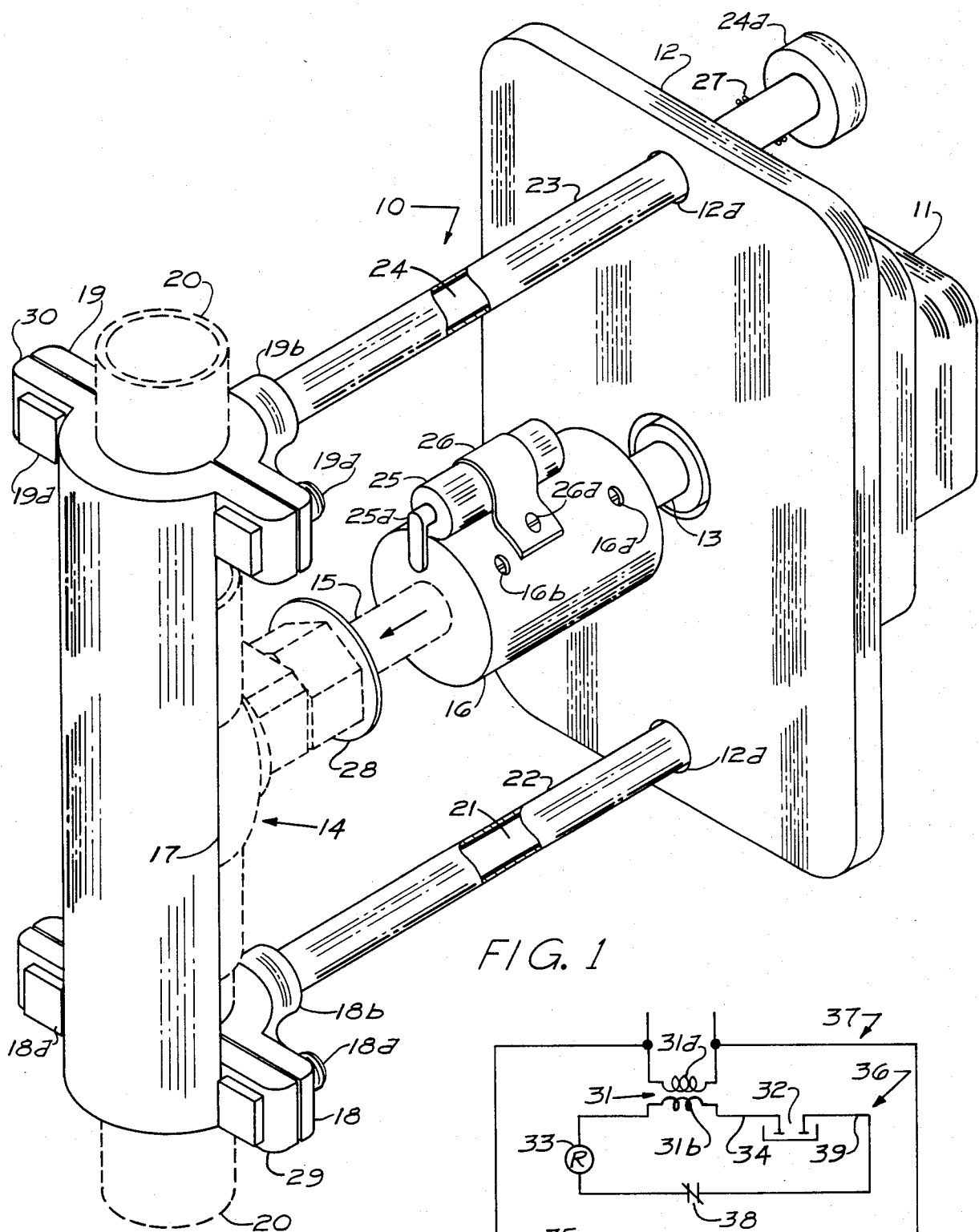
FIG. 1 is an isometric view of automatic valve closure means constructed according to the present invention.

Referring to the drawings and to FIG. 1, number 10 indicates an automatic valve closure means constructed as a preferred embodiment. The device 10 includes gear motor 11, having support plate 12 on the front face of said gear motor, said support plate 12 containing hole 12a through which pass threaded rods 21 and 24 enclosed in sleeves 22 and 23, said rods cooperating with plate 12 to support motor 11; said rods subsequently engaging sockets 18b and 19b; each socket being part of a half ring 18 and 19 enclosing supply line 20, containing shutoff valve 14. The half rings 18 and 19 connect to corresponding half rings 29 and 30 respectively, said half rings 29 and 30 forming the extremities of bracket 17, said bracket encircling aforesaid supply line 20 to capture half rings 18 and 19 as required for coupling by means of fasteners 18a and 19a, said fasteners engaging holes in each half ring.

Aforesaid rods 21 and 24 engaging sockets 18b and 19b respectively and supporting motor 11 reside within sleeves 22 and 23 respectively, said sleeves being constructed of a low coefficient of friction material, such as Teflon, to permit said support plate 12 to slide easily along the surfaces of said sleeves in a manner to be explained.

Motor 11 has extended shaft 13 engaging one end of coupling 16 and being anchored to said coupling by means of fastener 16a. The opposite end of said coupling 16 extends onto valve stem 15 and is rigidly connected by fastener 16b; aforesaid valve stem 15 being a part of valve 14 has rotational capabilities to operate an internal mechanism of said valve to control flow through pipe 20. Anchored to coupling 16 by means of bracket 26 and fastener 26a (FIG. 1) is plunger switch 25, said switch having a switch activator 25a.

Figure 2:
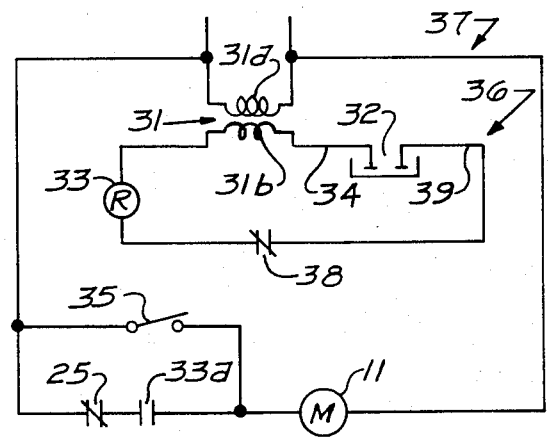
FIG. 2 is a schematic diagram of the present device including a secondary low voltage relay circuit and a primary motor operating circuit.

Referring to FIG. 2, the schematic diagram of the electrical circuit controlling the automatic valve closer, number 32 shows an electrolytic switch, said switch being a container having salt, such as sodium chloride; said container engaging contacts on the ends of conductors 34 and 39, is placed beneath the aforesaid tank or like equipment. When, during normal operations aforesaid tank or like equipment springs a leak or ruptures, a portion of the liquid runs into the container, causing the salt to dissolve and form an electrolytic solution that, as is well known, conducts an electrical current, thereby providing a closed circuit through low voltage coil 31b, of transformer 31, and relay 33. Relay 33, upon being energized, closes normally open contacts 33a in primary circuit 37, permitting current to flow through the normally closed contacts 25, contacts 33a (presently closed) and motor 11. As shown in FIG. 2, switch 35 is a manually operated switch permitting manual operation of motor 11 independently of other said control means.

When motor 11 (FIG. 1) rotates shaft 13, coupling 16, attached to shaft 13 and valve stem 15 in the manner previously described, transmits rotation of said motor to valve stem 15 thereby closing valve 14 and terminating flow in pipe 20. The rotation of coupling 16 brings switch actuator 25a of switch 25 in contact with de-activator 28, said switch de-activator bearing solidly against portions of valve 14, forces said switch actuator 28 to open normally closed contacts 25 and 38 and de-energize circuits 36 and 37 (FIG. 2), thereby terminating rotation of motor 11 and de-energizing relay 33. During the rotation of valve stem 15, the stem translates linearly along its longitudinal axis as shown by the arrow in FIG. 1, resulting in like and equal translation of support plate 12 and connected motor 11. The translation of plate 12 and motor 11 is accommodated by the holes 12a having their surfaces sliding along aforesaid low coefficient of friction sleeves 22 and 23, the translation being aided by means of compression spring 27 (typical for rods 21 and 24), shown in brief manner and broken, in FIG. 1; said springs cooperating to assist plate movement and alignment. Upon repair or replacement of said tank, the automatic valve closer device 10 is returned to its initial position to provide an open supply line 20.

Though not shown, covering means are provided to prevent an accumulation of dust and dirt on rods 22 and 23 and valve stem 15 as well as on any exposed components of motor 11.

Thus, there has been shown and described a novel automtic valve closer and detection means which fulfills all the objects and advantages sought after. Many changes, modification, variations, and other uses and applications of the present device will, however, become apparent to those skilled in the art after considering this specification and accompanying drawings. All such changes, modifications, variations, and other uses and applications which do not depart from the spirit and scope of the invention are deemed to be covered by the invention which is limited only by the claims which follow:

I claim:

1. Closure means having translatory motor means, said closure means automatically rotating a valve to a closed condition upon detection of a leak or rupture in a device having fluid flow controlled by said valve; said closure means, having covering means, comprising in combination;
    (a) detection means, sensing the presence of said fluid outside the confines of said device; said detection means having a liquid containment receptacle receiving a portion of said fluid; normally open electrical contacts mounting in said receptacle, energizing relay means and said motor means coincident with a leak or rupture in said device;
    (b) electrical means having secondary circuit energizing relay means and controlling a primary circuit operating motor means; said motor means comprising a low rpm motor, energized through said contacts of said relay means and de-energized through contacts operable by said motor means;
    (c) coupling means interconnecting and providing translational and rotational continuity between said motor and a rotating element of said valve; said coupling means attaching to said shaft of said motor means and to said rotating element of said valve;
    (d) support means attaching said motor means and coupling means to a flow line and to said valve controlling said fluid flow; said support means comprising a bracket and connecting means interconnecting said flow line and providing for translatory movement of said motor means when said rotating element of said valve moves to an open of closed position.

2. The means defined in claim 1 wherein said motor means having translator means and operating means; said operating means actuating electrical contacts in a primary and a secondary circuit and concurrently controlling both said circuits.

3. The means defined in claim 1 wherein said electrical means having manual switch means, operating said motor means and having said relay means connecting said motor means to a voltage source.

* * * * *